United States Patent [19]

Chandler

[11] 4,048,744
[45] Sept. 20, 1977

[54] FLY FISHING LINE

[75] Inventor: Leon Chandler, Homer, N.Y.

[73] Assignee: Cortland Line Company, Cortland, N.Y.

[21] Appl. No.: 656,499

[22] Filed: Feb. 9, 1976

[51] Int. Cl.² .................................... A01K 91/00
[52] U.S. Cl. ................................. 43/17.5; 43/44.98
[58] Field of Search .......................... 43/17.5, 44.98

[56] References Cited

U.S. PATENT DOCUMENTS

| | | | |
|---|---|---|---|
| 2,547,308 | 4/1951 | Dean | 43/17.5 X |
| 2,563,522 | 8/1951 | Fisher | 43/17.5 X |
| 3,043,045 | 7/1962 | Martuch | 43/44.98 |
| 3,464,140 | 9/1969 | Carabasse | 43/44.98 X |
| 3,841,015 | 10/1974 | Gregory | 43/44.98 |
| 3,868,785 | 3/1975 | Foote | 43/44.98 |

Primary Examiner—Robert Peshock
Assistant Examiner—Daniel J. Leach
Attorney, Agent, or Firm—John P. Murphy

[57] ABSTRACT

The fly fishing line of the invention is a flexible fly fishing line having a section of said line near the end tip with a greater buoyancy than the remainder of said line, such section having a surface of a highly visible material, and said section and said surface material being integral with the fly fishing line.

4 Claims, 4 Drawing Figures

FLY FISHING LINE

BACKGROUND OF THE INVENTION

1. Field of the Invention

This invention relates generally to improvements in a fly fishing line a part of which is more buoyant and floats more visibly on top of the water, wherein a section of the line near the end tip has a greater buoyancy than the remainder of said line, and has a surface of a highly visible material.

2. Description of the Prior Art

The prior art contains many teachings of fly fishing lines formed of various materials in an effort to provide buoyancy so that all, or some section of the line will float on the surface of the water during a fishing or casting operation. Such lines have been made by oiling conventional silk lines and then thereafter wiping them, also by forming such lines of a thermoplastic material which is non-absorbent, such as nylon. Such lines have also been formed by forming the line of a hollow, flexible tube, the walls of which are impervious to water and lines which have been formed of a plastic material incorporating microspheroids made of glass, or of a plastic material. Examples of such fly fishing lines are shown in the following references:

R. C. Wilcox; 2,164,296
J. E. Pierce; 2,274,255
C. W. Volz; 2,748,525
L. P. Martuch; 3,043,045

SUMMARY

Briefly, the improved fishing line of the present invention includes a flexible fly fishing line having a sufficient stiffness to throw its own weight in casting, and sufficient buoyancy to float on the water for at least some sections of the line.

Most experienced trout fishermen understand that a most effective method of taking trout is through the use of artificial nymphs. It is said that 90% of the food used by stream trout is represented by the underwater nymph stage of aquatic insects. An angler skilled in the effective presentation of artificial nymphs will consistantly take more fish than one who relies only on the dry fly (which represents the winged form of aquatic insects) and is effective only for a very small portion of the life cycle of the aquatic insect.

Effective fishing with artificial nymphs requires a special technique. Most agree that the most effective technique is to cast upstream and to allow the artificial nymph to "tumble" in a natural manner, on or near the bottom of the stream. Consequently, the angler is fishing with a slack line in order to avoid impeding the "natural" drift of the artificial nymph. Trout will pick up and spit out an artificial nymph instantly. Effective nymph fishing requires that the angler must be able to detect the strike at the precise moment it is picked up, and before the trout has a chance to spit it out.

The customary method used in detecting a strike is to watch the tip of the line, at the point where it attaches to the leader. The angler sets the hook at any perceptible movement of the line tip. A problem with fly fishing lines which have been available, is that, in use the tip of the tapered line will have a tendency to settle into the water or even sink as it picks up a coating of surface debris from the water.

In order to overcome the problems set forth above, a fly fishing line has been devised where a more buoyant section, or a bulb is formed near the tip of the line. In order to insure that this section will float high in the water, the section is formed integral with the line and has a greater buoyancy than the remainder of the line. Also to give it a special degree of visibility, this more buoyant tip section is formed with a highly visible material thus enabling the angler to detect the less perceptible "strikes" when nymph fishing, and will enable the angler to set the hook before it is discarded by the fish.

DESCRIPTION OF THE PREFERRED EMBODIMENT

Figure 1:
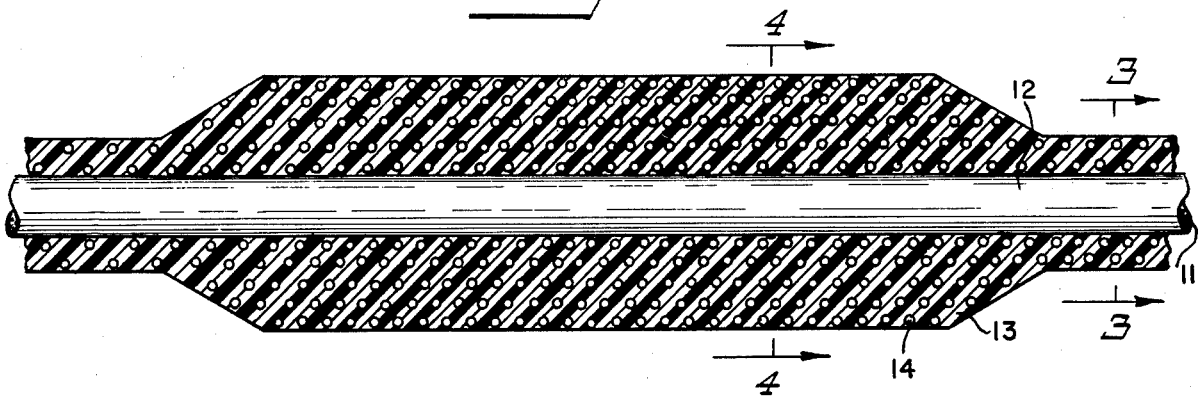
FIG. 1 is a longitudinal section of the fly line in accordance with the invention showing an enlarged section, or bulb, near the end tip having the same specific gravity as the remainder of the line, and having high visibility.

Referring now to FIGS. 1, 2, 3 and 4, a fly fishing line in accordance with the invention includes a core member 11 which is preferably made of nylon polypropylene, polyethylene, or silk filaments braided so as to form a cylinder having a substantially uniform diameter throughout its length. Alternatively, other cylindrical, stretchable base cores may be used, provided that the density of the core is not sufficiently high to cause the finished coated line to sink.

The nylon base core is treated with a uniform priming coating 12 of an adhesive material to permit satisfactory bonding of the subsequently applied plastisol coating to be described. An adhesive coating suitable for use with the nylon core is a synthetic rubber of the acrylonitrile-butadiene copolymer dissolved in a suitable organic solvent, such as methyl ethyl ketone or methyl isobutyl ketone. Such adhesives for bonding nylon with other polymers are known and obtainable commercially.

Superimposed upon the priming or adhesive intermediate coating 12 is a coating composition which comprises essentially a dispersion of finely divided polyvinyl chloride in plasticizers. The coating composition must be sufficiently viscous to form a relatively thicker covering or coating 13 over the adhesive primer coating. A polyvinyl chloride which will form a plastisol has a very small particle size on the order of one micron with a controlled degree of porosity, allowing it to disperse in a plasticizer but not to dissolve therein until heated to temperatures used for curing, e.g., about 180° Centigrade. A polyvinyl chloride which has proven particularly satisfactory is sold under the trade designation "Geon Paste Resin 121," manufacured by the B. F. Goodrich Chemical Company and described in U.S. Pat. No. 2,188,396. However, any polyvinyl chloride having a small particle size and a suitable degree of porosity, such as that sold under the trade designation VYNV3, Union Carbide Corp., or under the trade designation VR by the Marvinol Company, is suitable.

A suitable plasticizer or mixture of plasticizers is used with the polyvinyl chloride to produce an organosol or plastisol. These compositions are prepared having a consistency at least sufficient to maintain the desired coating diameter about the core after application and sizing with a doctoring blade or other sizing device. The viscosity of this composition may be greater than is ordinarily employed for plastisols in the coating field. This increased viscosity can be obtained by dissolving in the plasticizer a vinyl chloride-vinyl acetate copolymer contining from 10 to 15 percent of vinyl acetate. However,, any polymer which is soluble in a plasticizer will increase its viscosity, thereby permitting the use of the numerous equivalents for the purpose of increasing the viscosity of the plasticizer. The plasticizer may be any of conventional plasticizers, such as dioctyl adipate, -sebacate, phthalate, or trioctyl phosphate.

The buoyancy of the fishing line is increased to permit the line to float on the surface of the water by adding to the polyvinyl chloride plastisol mixture a controlled quantity of hollow microspheroids or microballoons 14 having a diameter range to from 2 to 200 microns. The microballoons 14 are preferably of the ureaformaldehyde type manufactured by Colton Chemical Company, Cleveland, Ohio. However, microballoons made of other materials may also be used, such as the phenolic microballoons made by the Union Carbide Corp., or glass microballoons made by the same company. The microballoons may be filled with air, nitrogen, helium or with other non-condensible gas.

The microballoons 14 are thoroughly mixed with the plastisol composition before it is applied to the line so as to be uniformly distributed throughout the mass of the plastisol. The proportion of microballoons to plastisol mixture varies depending upon the specific gravity desired for the line after coating. However, in a typical example, to obtain a line having a specific gravity of 0.95, three pounds of microballoons 14 per 100 pounds of polyvinyl plastisol having an initial specific gravity of 1.3 is used.

In manufacturing the fishing line, the braided nylon core 11 having a substantially uniform diameter is first coated with the adhesive priming coating 12, as previously described, to provide a suitable bond for the plastisol coating 13, and the adhesively coated nylon core is then passed through a coating tank containing the polyvinyl chloride plastisol mixture including microballoons 14 uniformly distributed throughout the mass thereof. The coated line is then passed in contact with a doctor blade or other sizing device to obtain the proper size coating.

In producing a fly fishing line, a variable orifice sizing device is preferably used so as to provide a coating of tapering diameter on the line. The thickness or outer diameter of the coating 13 is gradually reduced as the tip portion of the line is approached. The tapered line thus produced has a relatively light tip portion which is less visible to the fish, and a somewhat heavier main body portion. When such a tapered line is cast from the fishing rod, the heavier main body portion of the line causes propelling of the lighter or tapered tip portion. This in turn, causes propelling of the still lighter leader and lure.

Figure 2:
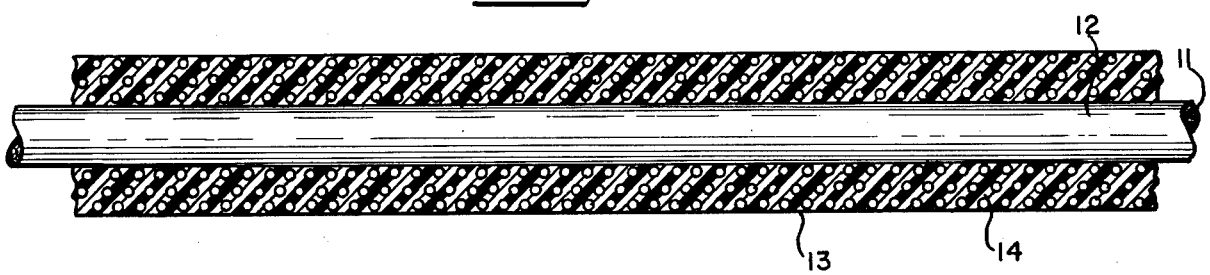
FIG. 2 shows an alternative means of achieving greater buoyancy near the end tip of the line by employing a lower density material having high visibility.
Figure 3:
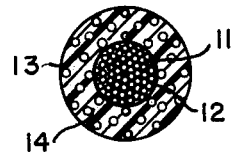
FIG. 3 is a cross sectional view of the fly line taken along the lines 3—3 of FIG. 1.
Figure 4:
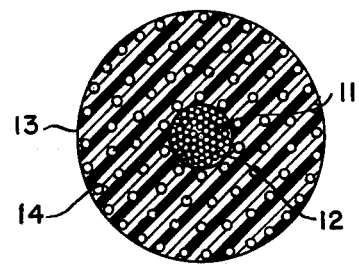
FIG. 4 is a cross sectional view of the fly line taken along the lines 4—4 of FIG. 1.

The important feature of the invention is the end tip of the line shown in FIGS. 1 and 2 where the diameter of the line is increased and the buoyancy thereof is increased by the addition of a larger number of microballoons 14 to decrease the specific gravity. Also, the composition of the coating mixture is changed to the extent that fluorescent coloring materials which are well known in the art are added to the coating material to produce a highly visible fluorescent coated area on the fishing line which is more buoyant and floats high in the water so as to be readily seen by the fishermen.

The second more buoyant area with a fluorescent material near the tip of the line, is produced by both varying the size of the orifice through which the line is drawn and also the composition of the plastisol coating 13, so as to produce a more buoyant section 13 and 14 having a greater visibility. A larger number of microballoons increases the buoyancy of the line in this area. While the processes can be described with a relation to a tapered line it may be used on a double tapered line, a rocket taper, a buck taper, or a salt water taper, or any of the existing types of fly lines may utilize the present invention.

After being sized as desired, the coated line is then passed through a heated zone where the temperature of the coating is caused to reach the curing temperature of about 175° degrees to 200° Centigrade, at which temperature the plasticizer will solvate the polyvinyl chloride particles and the plastisol will be cured. The heating of the coating 13 may be accomplished by radiant heating means, although other heating techniques which do not cause scorching of the coating 13 are satisfactory. The heating of the plastisol coating 13 at the curing temperature causes a hardening or setting of the coating 13 about the core 11, and provides a smooth outer surface.

In detail, a mixture 144 parts of an ester type plasticizer such a dioctyl phthalate, and 24 parts of a copolymer of vinyl chloride and 13% vinyl acetate was heated to dissolve the copolymer. A plastisol was then prepared of 75 parts of dioctyl sebacate, 85 parts of dioctyl adipate, 60 parts of dioctyl phthalate, 10 parts of mineral oil, 9 parts of a metal complex to stabilize polyvinyl chloride against heat degradation, and 550 parts of polyvinyl chloride having a particle size of about one micron and sufficient porosity to be dispersed in the plasticizer without dissolving. The two mixtures were combined with each other and three pounds of ureaformaldehyde microballons 14 was added to 100 pounds of the mixture and milled in a paint mill until the mixture was uniform and the microballoons 14 were uniformly distributed throughout the body of the mixture.

Thereafter a braided nylon core 11 was passed through an adhesive composition comprising an acrylonitrile-butadiene copolymer in methyl ethyl ketone to put a thin layer 12 of the adhesive on the core 11.

After heating at about 100° Centigrade for about two minutes, the core 11 having the adhesive thereon was passed through the polyvinyl chloride and microballoon coating mixture previously described. Near the end of line the composition of the coating was changed to include an orange fluorescent dye. Sufficient of the coating 13 adhered to the core 11 so that it was necessary to employ a doctoring device to size finally the coating 13.

As pointed out above, the doctoring device is expanded and the more buoyant section having the fluorescent coating, is formed by injecting the fluorescent composition through the doctoring device.

After sizing, the coating 13 was cured by heating for about one minute by a radiant heating device which produced temperatures within the coating of about 180°-200° Centigrade.

The fishing line of the invention is ideally suited for use in fly fishing, and floats without dressing. The line is flexible, resilient, and will stretch as may be necessary in use without cracking the coating. Furthermore, the use of microballoons 14 in the coating 13 to impart buoyancy to the line has the great advantage that the specific gravity of the finished line can be accurately controlld independently of the specific gravity of the core 11 by simply changing the proportion of microballoons 14 to the rest of the coating mixture during the manufacture of the line. A further control of the specific gravity of the line can also be provided by suitably selecting the gas with which the microballoons 14 are filled. Thus, helium-filled microballoons 14 provide a line of lower specific gravity for given volume of microballoons than air-filled microballoons. By the same methods the additional buoyancy of the brightly coated enlarged section near the end of the line can be controlled.

While there has been shown and described a particular embodiment of the invention, it will be obvious therefrom to those skilled in the art that equivalent materials and proportions may be used without departing from the inventive concept and, therefrom such changes and modifications as fall within the true spirit and scope of the invention are intended to be covered by the appended claims.

I claim:

1. A fly fishing line having a section of said line near the end tip with a greater buoyancy than the remainder of said line, said section having a surface of a highly visible material, said section and said surface material being integral with said fly fishing line.

2. A fly fishing line having a section of said line near the end tip with a specific gravity lower than the remainder of said line, said section being made with a highly visible material, said section and said material being integral with said fly fishing line.

3. A flexible, stretchable fly fishing line having a specific gravity below approximately 1.15 and having a relatively smooth outer surface, comprising: a substantially cylindrical core having a smooth plastic coating thereon, said plastic coating containing a large number of hollow preformed microspheroids, and said fly fishing line having a more buoyant section of said line near the end tip.

4. A flexible, stretchable fly fishing line having a specific gravity of approximately 1.15 and having a relatively smooth outer surface comprising: a substantially cylindrical core having a smooth plastic coating thereon, said plastic coating containing a large number of hollow preformed microspheroids, said fly fishing line having section of lower density near the end tip, said lower density section having a highly visible fluorescent material therein.

* * * * *